United States Patent
Park et al.

(10) Patent No.: US 7,272,117 B2
(45) Date of Patent: Sep. 18, 2007

(54) METHOD AND BASED STATION FOR TRANSMITTING DATA USING ADAPTIVE CODING SCHEME AT PHYSICAL LAYER IN W-CDMA SYSTEM

(75) Inventors: Seong Soo Park, Seoul (KR); In Hong Lee, Sungnam-si (KR); Jin Ick Lee, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 842 days.

(21) Appl. No.: 09/996,940

(22) Filed: Nov. 30, 2001

(65) Prior Publication Data

US 2002/0037000 A1 Mar. 28, 2002

(51) Int. Cl.
*H04L 1/18* (2006.01)

(52) U.S. Cl. .............. 370/320; 370/329; 370/341; 370/347; 714/749; 714/751; 714/786; 455/69

(58) Field of Classification Search ............. 714/750, 714/790
See application file for complete search history.

(56) References Cited

U.S. PATENT DOCUMENTS

| | | | | |
|---|---|---|---|---|
| 5,883,899 | A * | 3/1999 | Dahlman et al. | 370/468 |
| 5,909,434 | A * | 6/1999 | Odenwalder et al. | 370/342 |
| 5,946,320 | A * | 8/1999 | Decker | 370/428 |
| 5,983,384 | A * | 11/1999 | Ross | 714/755 |
| 6,101,626 | A * | 8/2000 | Morelos-Zaragoza et al. | 714/786 |
| 6,473,442 | B1 * | 10/2002 | Lundsjo et al. | 370/537 |
| 6,571,366 | B1 * | 5/2003 | Doetsch et al. | 714/751 |
| 6,621,873 | B1 * | 9/2003 | Lee et al. | 375/295 |
| 6,704,898 | B1 * | 3/2004 | Furuskar et al. | 714/751 |
| 6,735,180 | B1 * | 5/2004 | Malkamaki et al. | 370/282 |
| 6,856,625 | B1 * | 2/2005 | Shamsunder et al. | 370/394 |
| 6,895,051 | B2 * | 5/2005 | Nieweglowski et al. | 375/240.03 |

* cited by examiner

*Primary Examiner*—Huy D. Vu
*Assistant Examiner*—Roberta A. Shand
(74) *Attorney, Agent, or Firm*—Rothwell, Figg, Ernst & Manbeck

(57) ABSTRACT

The present invention relates to a method of transmitting data using adaptive coding scheme, which changes channel coding rate of transport blocks (TBs) adaptively in accordance with channel transmission conditions, at physical layer of asynchronous mobile communication system such as W-CDMA or IMT-2000 in order to achieve effective data transmission, and relates to a base station using the method. This method is to apply to a physical layer of an asynchronous mobile communication system where a SRNC consisting of a media access control (MAC) layer and radio link control (RLC) for transmitting channel data and a base station, connected to the SRNC with a wired interface, consisting of the physical layer being in charge of actual data transmission are included. According to this method, a new management module is added over the most upper layer of the physical layer to collect all acknowledgement information for each channel from an opposite physical layer, to determine a puncturing rate suitable to current channel conditions and to report the acknowledgement information to the MAC layer of the SRNC which decides whether to deliver down new TBs to the physical layer based on the received acknowledgement information.

11 Claims, 4 Drawing Sheets

METHOD AND BASED STATION FOR TRANSMITTING DATA USING ADAPTIVE CODING SCHEME AT PHYSICAL LAYER IN W-CDMA SYSTEM

BACKGROUND OF THE INVENTION

1. Field of the Invention

The present invention relates to a method of transmitting data using adaptive coding scheme, which changes channel coding rate of transport blocks (TBs) adaptively in accordance with channel transmission conditions, at physical layer of asynchronous mobile communication system such as W-CDMA or IMT-2000 in order to achieve effective data transmission, and relates to a base station using said method.

2. Description of the Related Art

For next generations of mobile communication system, standardization on synchronous and asynchronous system is going on. Related companies participate actively in the standardization to prepare for changes and trend of mobile communication technology.

The synchronous mobile system has been adopted in United States and some countries while major communication companies in Europe, Japan, Korea, and United States are participating in the standardization of asynchronous mobile system. Therefore, it is expected that asynchronous system of IMT-2000 will be main stream in the mobile communication system.

In the standardization of asynchronous mobile system of IMT2000, basic scheme has been completely set, however, optional standard for various supplementary functions is still under discussion at present. For such supplementary functions, technology on hybrid Automatic Retransmission Request (ARQ) and high-speed packet data transmission is under consideration in the optional standardization on wireless interfacing layers of asynchronous IMT-2000 system.

The two technologies aim at reducing transmission time and maximizing transmission efficiency of channels. In the field of hybrid ARQ, methods and procedures on transmitting additional information and soft combination are under discussion, and, in the field of high-speed packet data transmission, mechanisms about quick recovery from failure are under discussion. The two technologies are being standardized to resolve different issues, however, they have substantial common objective of maximizing transmission efficiency of packet data.

In the technique of hybrid ARQ, a puncturing rate is adjusted at transmission rate matching process to apply type II/III. The amount of substantial data being transmitted per a given time through a physical layer changes in proportion to the adjusted puncturing rate. At initial transmission, the puncturing rate is set to high, however, it is lowered as data retransmitted times are increased.

Applying hybrid ARQ, data delivery is guaranteed in good channel even if relatively small amount of data is transmitted, which improves efficiency of physical channel utilization. In addition, a receiving part stores transport blocks which contain errors in a buffer instead of discarding them, and combines the stored error-containing blocks with same blocks which are retransmitted with lower puncturing rate, therefore, errors will be reduced.

If errors occurs at radio link control (RLC) layer, it will take relatively long time to recover erroneously received blocks, which means reduction of transmission efficiency. Therefore, researches into retransmission mechanism is progressive in the high-speed packet data transmission service to resolve such a delay problem. These researches include a method of transmitting acknowledge information at physical layer for each data unit sized by transport time interval (TTI).

As aforementioned, the two techniques have common objective of improving efficiency of data transmission, therefore, it is preferable to combine the two techniques, namely, to apply the method of transmitting acknowledge information at physical layer to the hybrid ARQ, or to apply the hybrid ARQ to the high-speed packet data transmission service. If the two techniques are combined, then, more effective data transmission will be achieved.

SUMMARY OF THE INVENTION

It is an object of the present invention to provide a data transmission method using adaptive coding at physical layer of asynchronous mobile communication system, which accepts schemes proposed in both the hybrid ARQ II/III and the high-speed packet data transmission service by adjusting puncturing rate to adapt to current channel conditions based on acknowledgement from a receiver at physical layer.

A data transmitting method using adaptive coding of a physical layer of an asynchronous mobile communication system in accordance with the present invention, where the asynchronous mobile communication system includes a SRNC (Serving Radio Network Controller) consisting of a media access control (MAC) layer and radio link control (RLC) for transmitting channel data and a base station, connected to the SRNC with a wired interface, consisting of the physical layer being in charge of actual data transmission, comprising the steps of: receiving transport blocks (TBs) and their RLC sequence numbers (SNs) from the MAC layer through the wired interface, and keeping the received TBs and their RLC SNs stored for a predetermined time after discarding one or more TBs whose RLC SN is overlapped with pre-stored TBs; and adjusting a puncturing rate based on information on notifying acknowledgement, received from a remote counterpart, for previously-transmitted TBs, and applying the adjusted puncturing rate to the stored TBs in the middle of a preparing process for transmitting the TBs through a physical channel actually.

In the data transmitting method in accordance with the present invention, the acknowledgement information is provided for every TTI-grouped TBs between two communicating sides, and it is reported to the upper MAC layer which will decide whether to send new TBs based on the received acknowledgement information.

In addition, a receiver checks CRC to know whether each TB has an error and sends acknowledgement information notifying error or success, then a transmitter maintains a current puncturing rate and deletes acknowledged TBs stored in a transmitting buffer if the acknowledgement information is indicative of success, while it steps down the puncturing rate and retransmits TBs not acknowledged if the acknowledgement information is indicative of fail.

In the data transmitting method in accordance with the present invention, a management module is added over the most upper layer of a physical layer to collect all acknowledgement information for each channel from an opposite physical layer and it determines a puncturing rate suitable to current channel conditions. According to this method, acknowledgement between physical layers enables fast retransmission, and a puncturing rate to be applied to next transmission is adjusted. Especially, since it is proposed that the aforementioned functions are implemented at a physical layer, this method can be applied to a network node, whose function is related with wireless contacting point, such as a base station of asynchronous mobile system IMT-2000.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENT

Figure 1:
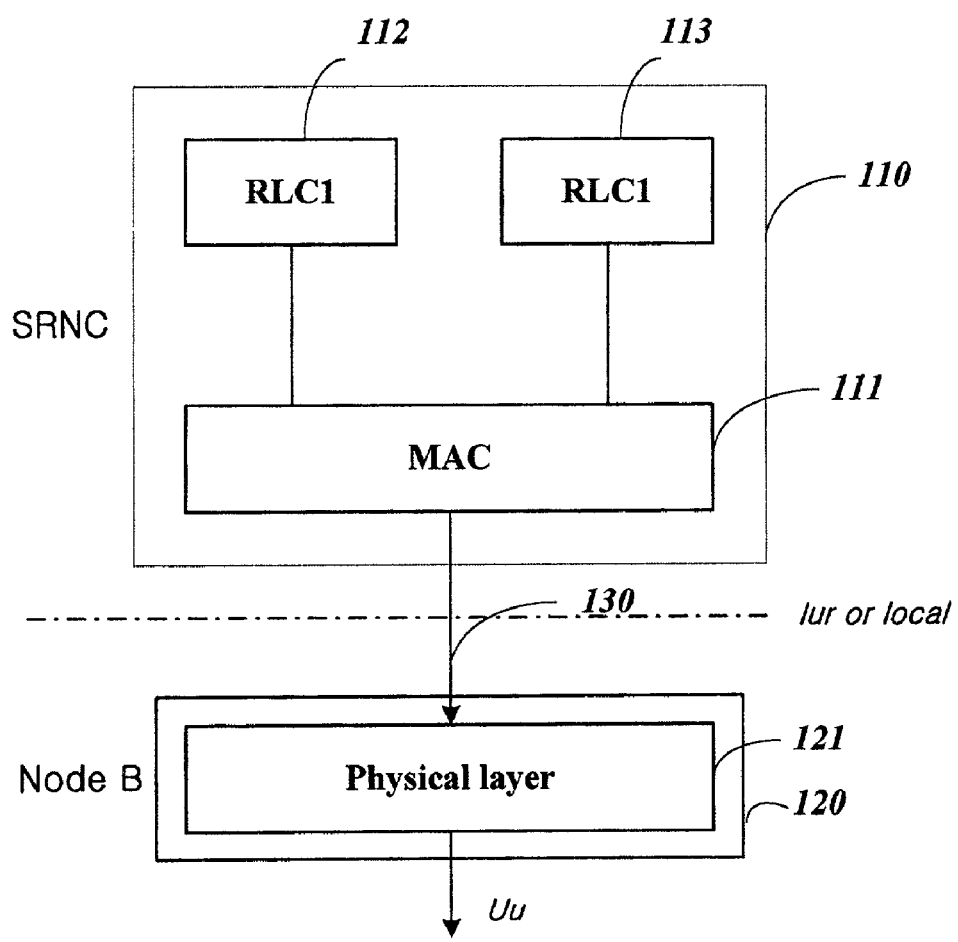
FIG. 1 shows protocol stack at network side of IMT-2000 mobile system.

In order that the invention may be fully understood, a preferred embodiment thereof will now be described with reference to the accompanying drawings.

Before explaining an embodiment of transmitting data with adaptive coding according to the present invention, technical factors to be considered in relation to asynchronous mobile communication system, IMT-2000 and W-CDMA are described first.

In the asynchronous IMT-2000 system, forward error correction (FEC) coding and CRC error detection are conducted at physical layer and erroneous frames are retransmitted at RLC layer to achieve reliable data transmission. The transmission efficiency of this scheme totally relies on both error recovery capability of FEC coding and retransmission mechanism at RLC layer. If more overhead information is added for error correction in FEC coding, transmission efficiency is lowered, namely, system capacity is reduced notwithstanding it is possible to effectively cope with errors in radio link.

In data retransmission mechanism at RLC layer, a receiver acknowledges through control packet data unit (PDU) whether or not it has received PDUs, then a transmitting RLC layer retransmits erroneous PDUs based on the acknowledgement. However, this retransmission mechanism has drawbacks of remarkable time delay and overhead. The time delay is caused from error detection and notification at a receiver and retransmission at a transmitter. A control PDU, which is for packet data acknowledgement, at RLC layer contains header information of RLC layer and media access control (MAC) layer. Header information of MAC layer is added to a control PDU when a control PUD is delivered to MAC layer. Accordingly, data to be transmitted from physical layer contains overhead information of RLC and MAC layer besides payload data.

There may be several methods for retransmitting a PDU which contains errors at a receiving side. One of these methods is periodic acknowledgement which is mainly used. The periodic acknowledgement prevents control PDUs, which are sent from a receiving RLC to a transmitting one, from being increased excessively. However, in periodic acknowledgement scheme, acknowledgement is forbidden for a predetermined time, which causes increment of a time delay until acknowledgement.

Accordingly, to support high-speed data transmission while guaranteeing effective channel efficiency, the aforementioned problems regarding FEC coding at physical layer and time delay of acknowledgement at RLC should be considered together.

In W-CDMA mobile system, in order to minimize influences against existing system due to introduction of hybrid ARQ, FEC coding rate is not changed in the middle of channel coding process at physical layer, instead, puncturing rate is adjusted in the middle of transmission rate matching process. As a result, an amount of data transmitted through physical channel is same as in the case of changing FEC coding rate. As described earlier, the more redundancy data, namely, error correction information transport data contain the better error recovery capability it has, however, if the amount of redundancy information is increased more, the occupancy of radio link for same amount of data is also increased so much, therefore, channel efficiency is reduced. This factor requires a new method of adjusting puncturing rate to adapt to characteristic of current error rate over a channel.

The retransmission mechanism, which is for error recovery in transmission at RLC layer, conducts retransmission in the unit of PDU periodically. In this retransmission mechanism, a lot of overhead information is added to a PDU when it is carried through physical layer, and remarkable time delay is caused when PDUs are retransmitted, which reduces data transmission efficiency. Accordingly, a new retransmission mechanism conducted at lower layer than RLC is needed to make it possible to serve effective high-speed data service.

In conclusion, it is necessary to adjust puncturing rate to adapt to channel condition and to conduct retransmission at a layer lower than RLC in order to provide effective data service.

Therefore, in an embodiment of the present invention, a field informing acknowledgement, which is conducted in TTI unit, is added in a frame defined at physical channel, and a management module determining puncturing rate based on current channel condition is added at upper part of a physical layer. Furthermore, the management module also conducts both retransmission in the unit of TB and flow control between physical layer and MAC.

FIG. 1 shows protocol stack at network side of IMT-2000 mobile system. As shown in FIG. 1, channel data transmitting entities of RLC1 112, RLC2 113, and MAC-d 111 are installed in a SRNC 110 while physical layer 121 in charge of actual transmission is installed in a base station 120, namely, node B which is connected with the SRNC 110 through Iur wired interface.

In the protocol scheme of FIG. 1, the MAC layer 111 slices data and converts each sliced data into a TB. Each TB is transmitted to the physical layer 121 of the base station 120 through the exclusive link of the Iur interface 130 between the base station 120 and the SRNC 110. The physical layer 121 conducts channel coding, rate matching, multiplexing, and interleaving for the received TBs which are then transmitted into radio link.

All the protocol entities 111, 112, 113, and 121 shown in protocol stack of FIG. 1 are integrated into one mobile station while they are separated at network side.

A MAC layer may be most effective to retransmit error-contained data based on acknowledgements received at a physical layer. This is because puncturing rate can be delivered to the physical layer through parameters with the least load to hardware resource and acknowledges are received directly from the physical layer. In addition, there is an advantage that an existing flow control with RLC is not changed.

While the method that a MAC layer is in charge of retransmission and determination of puncturing rate is applicable to a mobile station, it is not suitable to network side because signals are communicated with a delay due to the wired interface, namely, the Iur interface 130 between the base station 120 and the SRNC 110. Accordingly, the physical layer 121 is configured as shown in FIG. 2 and the physical layer 121 conducts both process of acknowledgements and determination of puncturing rate in proportion to current channel condition.

Figure 2:
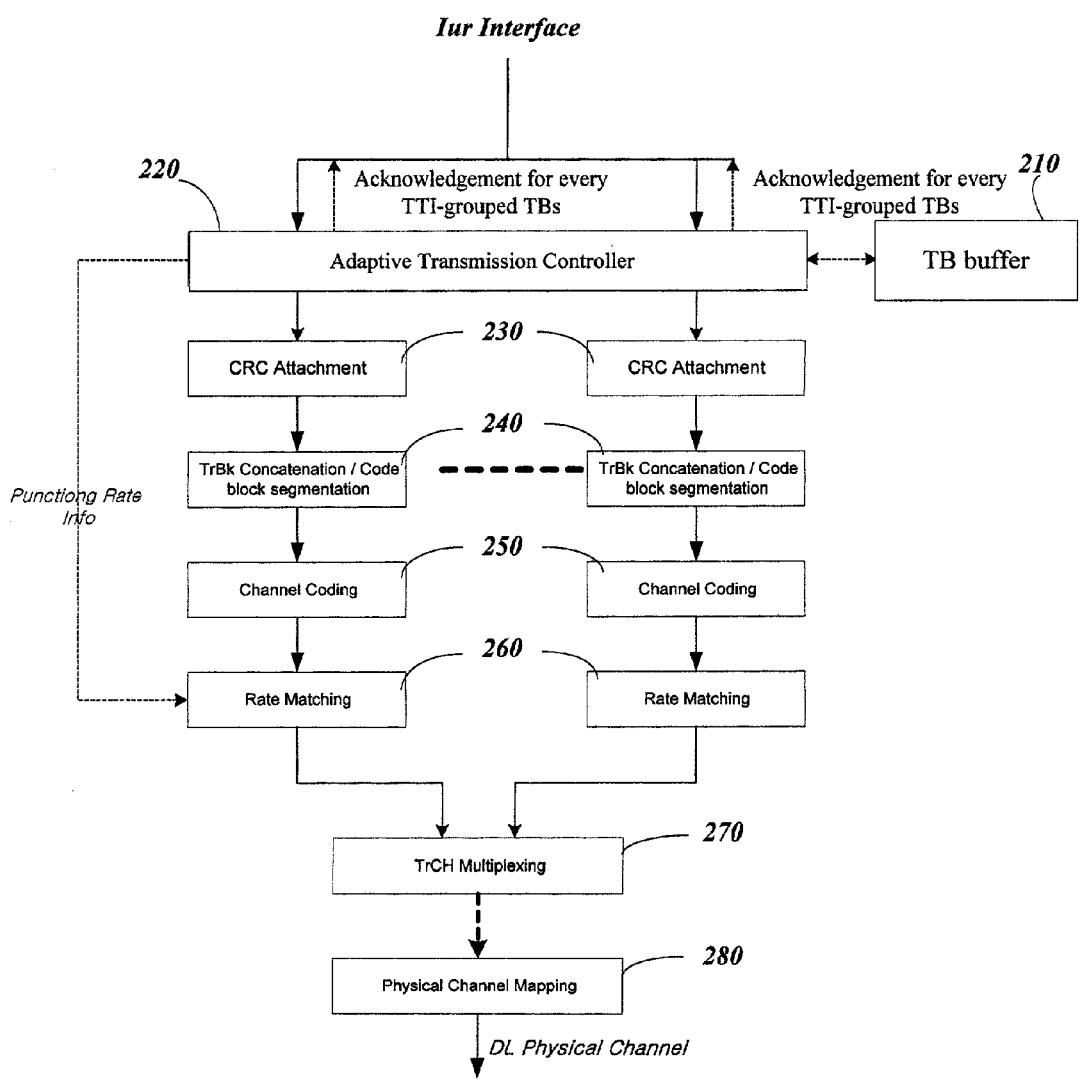
FIG. 2 is a detailed block diagram of a physical layer, which is able to conduct a data transmitting method using adaptive coding according to the present invention, of the base station depicted in FIG. 1.

FIG. 2 is a detailed block diagram of the physical layer 121, which is able to conduct a data transmitting method using adaptive coding according to the present invention, of the base station depicted in FIG. 1.

The physical layer configured as FIG. 2 comprises a TB buffer 210 storing TBs received from an upper MAC layer in a SRNC through an Iur interface, grouping TBs of each channel received for each TTI, and assigning an RLC sequence number to each grouped TBs; an adaptive transmission controller 220 managing data stored in the TB buffer 210 and determining puncturing rate of TBs based on whether they are acknowledged from a receiver through a physical channel, and controlling transmission of TBs; two CRC attaching units 230 for each channel, calculating CRC of a TB sent from the TB buffer 210 under control of the adaptive transmission controller 220, and attaching the calculated CRC to a corresponding TB; two concatenation/segmentation (C/S) units 240 assembling the CRC-attached TBs received from corresponding CRC attaching unit 230 through concatenation or segmentation to form a transport block of physical layer (called 'p-TB' hereinafter); two channel coding units 250 conducting channel coding for p-TBs from each C/S unit; two rate matching units 260 puncturing the channel-coded p-TB at a rate determined by the adaptive transmission controller 220; a multiplexing unit 270 multiplexing punctured p-TBs of all channels; and a channel mapping unit 280 interleaving the multiplexed p-TBs and mapping the interleaved p-TBs to a physical channel.

The TB buffer 210 is storing transmitted TBs for a predetermined time which is preferably set equal to or longer than an interval from transmission to acknowledgement arrival.

As aforementioned about the block diagram of FIG. 2, a management function of adjusting puncturing rate and controlling transmission based on whether to be acknowledged or not from a receiver is implemented in the physical layer. The adaptive transmission controller 220, which conducts the management function, is positioned at the most upper stack of the physical layer as shown in FIG. 2, and it stores TTI-grouped TBs of each channel in the TB buffer 210 and determines puncturing rate of each TB.

The adaptive transmission controller 220 also manages the TB buffer 210 based on a response, which is received after a round trip delay through the physical layer, for transmitted TBs. That is, if a received response is indicative of 'ACK' which means successful transmission, the adaptive transmission controller 220 deletes a corresponding TB in the TB buffer 210, and if 'NAK' which means erroneous transmission, it conducts retransmission of a corresponding TB. A conventional method such as a window mechanism may be applicable to the management for TBs stored in the TB buffer 210.

All the elements 210 through 280 have been explained from a transmitting point of view. At receiving side, all the elements 210 through 280 will conduct respective counter operations explained above. Therefore, received p-TBs are demultiplexed into p-TBs of each channel before channel decoding.

Figure 3:
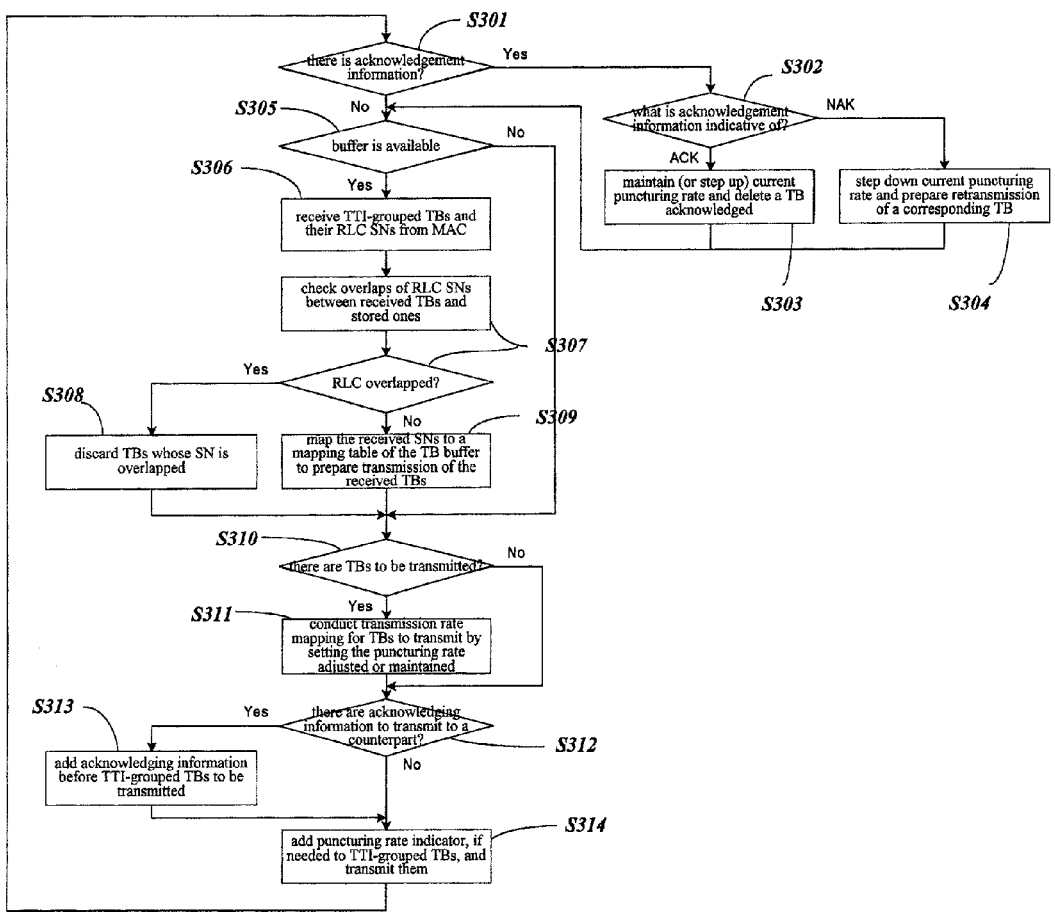
FIG. 3 shows a flow diagram embodying a data transmitting method using adaptive coding, which is applicable to a physical layer of asynchronous mobile communication system, in accordance with the present invention.

FIG. 3 shows a flow diagram embodying a data transmitting method using adaptive coding, which is applicable to a physical layer of asynchronous mobile communication system, in accordance with the present invention. The flow diagram of FIG. 3 is conducted at the adaptive transmission controller 220 of the physical layer configured as FIG. 2.

First, the adaptive transmission controller 220 checks whether or not there is acknowledgement information received from a counterpart (S301), and, if there is, it checks again whether the acknowledgement information is indicative of 'ACK' or 'NAK' (S302).

If 'ACK', a current puncturing rate is maintained and TBs acknowledged are deleted in the TB buffer 210 (S303). However, if 'NAK', the current puncturing rate is adjusted and, at the same time, a window mechanism is regulated such that TBs, which are stored in the TB buffer 210, not acknowledged are to be retransmitted (S304).

If there is no acknowledgement information at the step S301 or after the step S303 or S304 is conducted, it is checked whether the TB buffer 210 is available (S305). If available, the adaptive transmission controller 220 receives TTI-grouped TBs and their RLC PDU sequence numbers from the MAC layer 111 of the SRNC 110 through the Iur interface 130 (S306).

Then, the adaptive transmission controller 220 checks whether some or all of the received RLC PDU sequences numbers are overlapped with those of TBs stored in the TB buffer 210 (S307) If there are overlapped sequence numbers, the adaptive transmission controller 220 discards the received TBs of overlapped sequence numbers (S308), otherwise, it stores the received TBs in the TB buffer 210 and maps the corresponding received sequence numbers to a mapping table of the TB buffer 210 (S309) so that they will be transmitted in order.

If the TB buffer 210 is not available at the step S305, or after the step S308 or S309 is conducted, it is checked whether or not there are TBs to transmit (S310). If there are, the adaptive transmission controller 220 conducts transmission rate mapping for TBs to transmit (S311) by setting the puncturing rate adjusted or maintained after the step S303 or S304 to the rate matching unit 260 of a corresponding channel.

Figure 5:
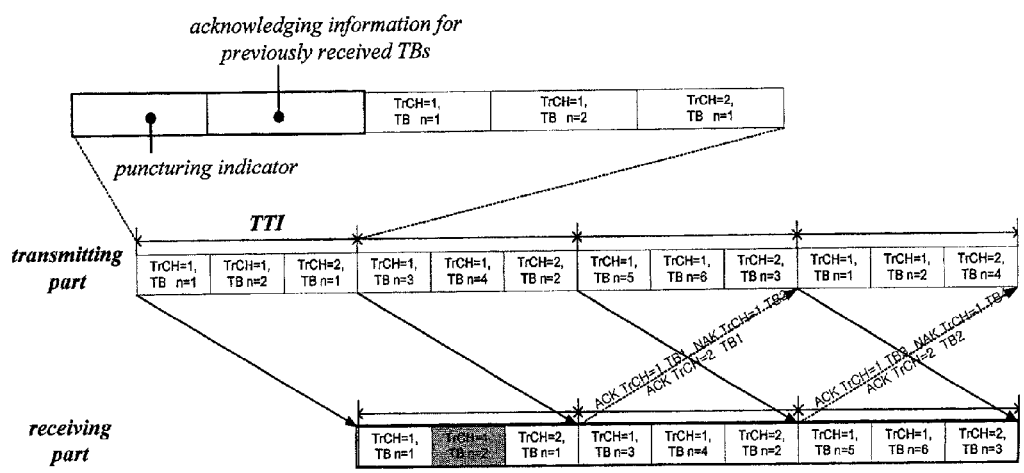
FIG. 5 shows a format example of data transmitted at a physical layer and data acknowledging sequences.

If there is no TB at the step S310 or after the step S311 is conducted, it is checked whether there is acknowledging information, which should transmitted to a counterpart, for one or more received TBs (S312). If there is, the acknowledging information is prepositioned to TBs to transmit as shown in FIG. 5 (S313). If there is no acknowledging information, or after the step S313 is conducted, information on puncturing rate applied at the step S311 is added (S314), if necessary, as a puncturing rate indicator ahead of TBs to transmit as shown in FIG. 5. After such addition, TBs are transmitted.

The above explained steps S301 through S314 are conducted repeatedly.

In the present invention, the TB buffer 210 for storing TBs and waiting their receipt acknowledgement has a size of round trip delay (RTD) of a data, and it is determined whether retransmission is to be conducted or not based on whether transmitted TBs are acknowledged after RTD. Furthermore, acknowledgement is delivered for each TTI-grouped TBs of each channel to the MAC layer so that it is determined at the MAC layer whether or not to retransmit. In addition, RLC sequence number of a TB is additionally kept monitored to avoid possible double retransmission by both RLC layer and MAC layer. The adaptive transmission controller 220 of the physical layer adjusts the puncturing rate based on whether transmitted TBs are acknowledged or not as aforementioned. Namely, the current puncturing rate is maintained if 'ACK' is received, however, it is stepped down if 'NAK' is received.

Figure 4:
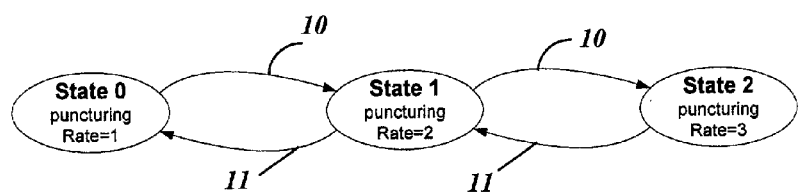
FIG. 4 is a state transition diagram showing a puncturing rate adjusting mechanism conducted for each channel by an adaptive transmission controller of the physical layer in accordance with the present invention.

FIG. 4 is a state transition diagram showing a puncturing rate adjusting mechanism conducted for each channel by the adaptive transmission controller 220 of the physical layer in accordance with the present invention.

In FIG. 4, the transition flow marked '10' represents the case that all transmitted TBs punctured at the current puncturing rate are acknowledged successfully while the transition marked '11' represents the case that neither of transmitted TBs punctured at the current puncturing rate are acknowledged. If 'ACK' and 'NAK' are mixed in the receipt responses, the current puncturing rate is not changed.

FIG. 5 shows a format example of data transmitted at a physical layer and data acknowledging sequences.

A transmitter inserts channel number 'TrCH' and TB sequence number 'TBn' in each TB included in each TTI-grouped TBs stored in the TB buffer 210. A receiver decodes TBs included in each TTI-grouped TBs and then notifies the transmitter of 'ACK' or 'NAK' for all TBs in each TTI-grouped TBs based on whether the decoding is successful or not. The notification has syntax such as "ACK TrCH=1, TB1" and "NAK TrCH=1, TB2" and is conducted whenever TTI-grouped TBs are received. Transmission and retransmission of a transmitter and acknowledgement of a receiver are regulated by an ARQ mechanism whose window size is same with round trip delay.

The adaptive transmission controller 220, which received ACK/NAK from a counterpart, of the physical layer of a transmitter reports the received information on acknowledgement for every TTI-grouped TBs to the upper layer, namely, the MAC layer 111 through the Iur interface 130. Therefore, the MAC layer 111 does not deliver new TBs to the physical layer if errors occurred in the previous TBs.

If the information on acknowledgement is indicative of error in at least one TB included in the first TTI-grouped TBs as shown in FIG. 5, for example, if TB2 of channel 1 is not acknowledged, the adaptive transmission controller 220 of the physical layer retransmits both TB1 and error-contained TB2, which are located at the most forepart of a transmitting window and whose channels are same, having been included in the first TTI-grouped TBs having carried the error-contained TB2. In the meantime, TBs acknowledged successfully are deleted from the transmitting window.

According to the retransmitting operation explained, the TB1 and the error-contained TB2 which have been included in the first TTI-grouped TBs are retransmitted in the fourth TTI-grouped TBs as shown in FIG. 5.

According to the above-explained data transmitting method with adaptive coding, it is possible to use effectively wireless resources of asynchronous mobile communication system such as IMT-2000 and to transmit data fast through the wireless resources. Therefore, a service provider adopting the above-explained data transmitting method with adaptive coding can strengthen its competitive power through effective data communication service.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data transmitting method using adaptive coding of a physical layer of an asynchronous mobile communication system where a Serving Radio Network Controller (SRNC) consisting of a media access control (MAC) layer and radio link control (RLC) for transmitting channel data and a base station, connected to the SRNC with a wired interface, consisting of the physical layer being in charge of actual data transmission are included, comprising the steps of:

(a) receiving transport blocks (TBs) and their RLC sequence numbers (SNs) from the MAC layer through the wired interface, and keeping the received TBs and their RLC SNs stored for a predetermined time after discarding one or more TBs whose RLC SN is overlapped with pre-stored TBs; and (b) adjusting a puncturing rate based on information on notifying acknowledgement, received from a remote counterpart, for previously-transmitted TBs, and applying the adjusted puncturing rate to the stored TBs in the middle of a preparing process for transmitting the TBs through a physical channel.

2. The method set forth in claim 1, wherein said acknowledgement information is received for every transDort time interval (TTfl-grouped TBs from the remote counterpart.

3. The method set forth in claim 2, further comprising the step of reporting said acknowledgement information to the MAC layer.

4. The method set forth in claim 1, wherein said step (b) maintains the puncturing rate if said acknowledgement information is indicative of non-error while said step (b) steps down the puncturing rate if said acknowledgement information is indicative of an error.

5. The method set forth in claim 1, wherein said predetermined time is equal to or longer than a time elapsing from transmission of a TB till arrival of acknowledgement of non-acknowledgement of the TB.

6. The method set forth in claim 1, further comprising the step of (c) deleting a TB among the pre-stored TBs if said acknowledgement information for the TB is indicative of non-error, or retransmitting the TB if said acknowledgement information for the TB is indicative of an error.

7. The method set forth in claim 6, wherein said step (c) retransmits an error-indicated TB together with other TBs, whose channel is same with the error-indicated TB, included in transDort time interval (TTI)-grouped TBs containing the error-indicated TB.

8. The method set forth in claim 1, wherein said step (b) transmits the stored TBs with acknowledging information for previously-transmitted TBs, the acknowledging information being prepositioned to the TBs.

9. The method set forth in claim 1, wherein said step (b) transmits the stored TBs with information on the puncturing rate applied to the TBs, the puncturing rate information being prepositioned to the TBs.

10. A base station of an asynchronous mobile communication system including a physical layer where the asynchronous mobile communication system includes a Serving Radio Network Controller (SRNC) consisting of a media access control (MAC) layer and radio link control (RLC) for transmitting channel data and the base station, connected to the SRNC with a wired interface, consisting of the physical layer being in charge of actual data transmission, the physical layer comprising:

a buffer storing transport blocks (TBs) received from the MAC layer through the wired interface;

a controller discarding a TB stored in said buffer or controlling retransmission of the TB based on whether or not the TB is acknowledged from a remote counterpart, and determining a puncturing rate of a TB based on acknowledged information from the remote counterpart;

a CRC attaching means calculating CRC of each TB sent from said buffer under control of said controller, and attaching the calculated CRC to the corresponding TB;

a concatenating/segmenting means organizing the CRC-attached TBs from said CRC attaching means through concatenation or segmentation to adapt the TBs to the physical layer;

a channel coding means channel-coding the adapted TBs from said concatenating/segmenting means;

a puncturing means puncturing each channel-coded TB at a rate determined by said controller;

a multiplexer multiplexing the punctured TBs of all channels; and a mapping means interleaving the multiplexed TBs and mapping the interleaved TBs to a physical channel.

11. The base station set forth in claim 10, wherein said controller controls all TBs, whose channel is same with an error-indicated TB, included in TTI-grouped TBs containing the error-indicated TB to be retransmitted if retransmission is to be conducted.

* * * * *